United States Patent
Ohletz et al.

(10) Patent No.: US 7,926,822 B2
(45) Date of Patent: Apr. 19, 2011

(54) ADJUSTMENT DEVICE FOR SUSPENSION MEANS

(75) Inventors: Armin Ohletz, Kösching (DE); Wilfried Michel, Riedenburg (DE)

(73) Assignee: Audi, AG, Ingolstadt (DE)

( * ) Notice: Subject to any disclaimer, the term of this patent is extended or adjusted under 35 U.S.C. 154(b) by 175 days.

(21) Appl. No.: 12/261,813

(22) Filed: Oct. 30, 2008

(65) Prior Publication Data

US 2009/0108546 A1    Apr. 30, 2009

(30) Foreign Application Priority Data

Oct. 31, 2007    (DE) .............. 10 2007 051 971

(51) Int. Cl.
*B60G 17/005* (2006.01)
*B60G 17/015* (2006.01)

(52) U.S. Cl. ............. 280/5.514; 280/5.501; 280/6.157; 280/6.158; 280/124.179

(58) Field of Classification Search ............. 280/5.501, 280/5.514, 6.157, 6.158, 124.179
See application file for complete search history.

(56) References Cited

U.S. PATENT DOCUMENTS

| | | | |
|---|---|---|---|
| 7,237,780 B2 * | 7/2007 | Ohki | 280/6.157 |
| 2004/0232648 A1 * | 11/2004 | Ohki | 280/124.164 |
| 2007/0210539 A1 * | 9/2007 | Hakui et al. | 280/5.514 |
| 2009/0045595 A1 * | 2/2009 | Michel | 280/6.157 |
| 2009/0283977 A1 * | 11/2009 | Michel | 280/6.157 |

FOREIGN PATENT DOCUMENTS

| | | |
|---|---|---|
| DE | 199 55 410 A1 | 5/2001 |
| DE | 10 2007 051 971 | 9/2010 |

* cited by examiner

*Primary Examiner* — Paul N. Dickson
*Assistant Examiner* — Barry Gooden, Jr.
(74) *Attorney, Agent, or Firm* — Novak Druce + Quigg LLP (57) ABSTRACT

An adjustment device for suspension means in wheel suspensions of motor vehicles, with the suspension means having a first spring, for example a bearing spring that is arranged between the assembly of the motor vehicle and wheel guide elements, and/or a second spring, for example a preloaded spring that is connected in parallel or in series, as well as an electrically-actuated actuator, by means of which a force adjustment between the motor vehicle assembly and the wheel guide elements is made possible. According to the invention, the electric actuator is provided with an integrated brake or lock that acts in a bistable manner in such a way that in the unpowered state, it can occupy an open or closed position, and can be switched by means of electric actuation from the open to the closed position and vice versa.

14 Claims, 5 Drawing Sheets

ADJUSTMENT DEVICE FOR SUSPENSION MEANS

The invention relates to an adjustment device for suspension means in wheel suspensions in motor vehicles.

BACKGROUND OF THE INVENTION

Such wheel suspensions with partial load-bearing, active suspension means with a bearing spring and a preloaded spring and an electric actuator for automatic leveling and dynamic ride control of the body of the motor vehicle are known, cf., e.g., DE 199 55 410 A1. An electromagnetically-actuated brake or lock that secures the adjustment drive in the respectively set position there can be provided on the adjustment drive of the actuator.

In the known wheel suspension, the adjustment of a spring seat, on which both the bearing spring and the preloaded spring are supported on both sides, is carried out with an electric motor on a ball screw. The common spring base of preloaded spring and bearing spring is altered in its height position according to dynamic performance requirements. Thus, the electric motor must be constantly loaded with more or less current. When the motor vehicle is shut off, a certain quiescent current must also flow in this instance in order to ensure that the motor vehicle remains at a constant height. When the current is interrupted, the motor vehicle, corresponding to its temporary load condition, would sink until a static equilibrium between bearing spring or preloaded spring prevailed. If the motor vehicle were accidentally to be located over an obstacle, for example a curb, subsequent damage is possible. Thus, for example, the oil pan or the body could be damaged.

Moreover, not only must the electric motor of the height adjustment device be locked when the motor vehicle is shut off, but also in the event that various error conditions occur in normal driving. Thus, in the event that a control signal of the motor vehicle regulator is not present or is false, it has to be ensured that the electric motor comes to a halt in the middle position of the adjustment travel and is also held by the stop.

The object of the invention is to propose an adjustment device of the generic type that makes greater allowance for the safety and functional requirements when the motor vehicle is driven normally.

SUMMARY OF THE INVENTION

According to the invention, it is proposed that the electric actuator be provided with an integrated brake or lock that acts in a bistable manner in such a way that it can occupy an open or closed position in the unpowered state and can be switched by means of electric actuation from the open position into the closed position and vice versa. According to the invention, it was found that in the generic wheel suspensions, it is especially advantageous when the brake or lock (depending on the design) can be switched into the open or closed position for fail-safe considerations or malfunctions, without, however, the relative adjusting element (in particular an electromagnetically-actuated adjusting element) having to be powered continuously. Bistable, preferably electromagnetically actuated positioners are known from other fields of application and are familiar to one skilled in the art. In this instance, the brake or lock preferably fits frictionally into a corresponding toothed wheel work of an adjusting element. The contact point of the lock and the way the lock engages is not defined according to the invention. Thus, the lock can directly engage in the electric motor, gears, or in the bearing spring or differential spring. In this case, the lock engagement can be positive or non-positive.

As the above specification indicates, the lock in the unpowered state can be both open and locked, as desired. Thus, the lock can be actively locked and actively unlocked. A first current pulse can correspond to a locking, another to an unlocking, the next again to a locking, etc. The lock or the brake is designed as a ratchet locking mechanism.

With the invention, a defined shutdown position of the electric motor, and thus a defined trim position of the motor vehicle, is ensured. The triggering of the locking of the adjustment device can be assumed by the local actuator-control device or a higher-level central control device depending on the design. In this case, the lock can engage in any operating situation. In the event that an adjustment signal of the motor vehicle regulator is not present or is false, the electric motor according to the invention can be connected without torque. It is ensured, moreover, by the deliberate triggering of the stop that at that moment, the actuator also is not locked in the unpowered state, in as much as, for this fault, it is intended that an adjustment spindle be moved by itself into a force-free center position by the outside forces (because of the partial load-bearing system that consists of preloaded spring and bearing spring).

Since, according to the invention, the lock is only actively locked and actively unlocked, also no holding energy is necessary when the vehicle is parked. A confirmation of the current position of the electric motor can be directed to the power electronics via a rotor position sensor. The rotor position sensor can be positioned in a stationary manner.

Thus, e.g., the brake or lock can be switched into the closed position to put the adjustment device in the position that was just set. This ensures that there are no significant changes in the motor vehicle's trim position when the motor vehicle is shut off compared to the trim position when the motor vehicle is being driven.

In addition, the brake or lock in the "open" position can be switched if, e.g., the loss of an electric actuator or another malfunction is detected via the electronic chassis control of the motor vehicle. In this respect, an undesired shutting-off of the actuator in dynamic performance-critical conditions is avoided.

In both positions of the brake or lock, the latter can be unpowered after the switching because of the bistable actuation or configuration thereof, that is, the electric power supply of the motor vehicle is not stressed; moreover, the electromagnetic adjusting element of the brake or lock does not have to be designed for long-term stress.

Only by way of example can a lock with a bistable action be designed with a locking pin that is actuated via a mechanical step switching system, whereby said pin in the closed position engages in a toothed wheel work of an adjusting member that is actuated by the electric motor of the actuator.

In the case of a positive-action lock, the locking pin can advantageously be flexibly prestressed in the locking position against the toothed wheel work of the adjusting member by interposing a spring. Thus, it is ensured that the lock is not locked in an overlapping of the locking pin with a tooth point of the toothed wheel work; as soon as there is an overlapping with a corresponding tooth gap, the locking pin engages in the tooth gap by spring actuation.

In addition, it is proposed that the adjusting member that interacts with the lock is a threaded spindle that is actuated by the electric motor or ball nut of a ball screw that acts on the preloaded spring. Such drives are especially smooth-running and can be triggered precisely.

In this case, the ball screw can be arranged around a telescoping shock absorber of the wheel suspension of the motor vehicle and within a helical preloaded spring with the electromagnetic lock being arranged in a stationary manner in radial orientation to the threaded spindle or ball nut.

Furthermore, in a way that is advantageous in terms of structure and production, the step switching system of the electromagnetic lock can essentially consist of a solenoid-actuated stud with inclined positioning surfaces, a stationary gear shifting gate, a switching link that is rotatably guided, and a transfer mandrel, which acts via an adjustment bushing on a prestressed return spring and on the locking pin.

In this case, the spring that flexibly loads the locking pin can be advantageously arranged physically within the adjustment bushing, and can prestress the locking pin against an annular collar of the adjustment bushing.

The lock with the step switching system can advantageously be arranged, moreover, in a radial hole of a base plate, which accommodates, moreover, the electric motor of the actuator, and on which the cylinder rod of the shock absorber and the preloaded spring are supported on the assembly side.

Finally, in a structurally simple way, the toothed wheel work on the threaded spindle of the ball screw can be a crown toothed wheel work incorporated on the front side of the threaded spindle. The crown toothed wheel work can also be integrated directly into the rotor of the motor armature.

DETAILED DESCRIPTION OF THE PREFERRED EMBODIMENT OF THIS INVENTION

Figure 1:
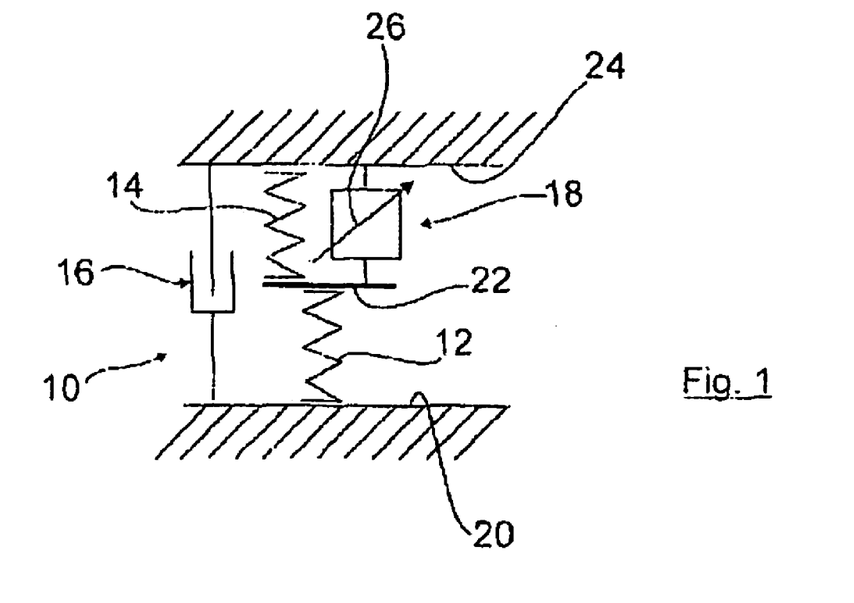
FIG. 1 an equivalent circuit diagram of a partial load-bearing, active suspension means for wheel suspensions of motor vehicles, with a series-connected bearing spring and a preloaded spring, as well as with an electric actuator with a bistable brake or lock.

FIG. 1 shows a partial load-bearing, active suspension and damping means 10 for wheel suspensions of motor vehicles, with a bearing spring 12, a preloaded spring 14, a telescoping shock absorber 16, and an electric actuator 18.

The bearing spring 12 and the shock absorber 16 are supported on their lower end on a wheel guide element 20 of the wheel suspension; this can be in detail a wheel trunk or a guide rod.

The upper end of the bearing spring 12 is supported on a movable spring seat 22, on which the lower end of the preloaded spring 14 is also supported in series connection, which preloaded spring is supported in turn on its upper end like the shock absorber 16 in the assembly 24 of the motor vehicle. The assembly 24 comprises both the body and the axle support.

The adjustable spring seat 22 can be adjusted in height by means of the electric actuator 18 that is connected between the assembly 24 and the adjustable spring seat 22, as a result of which the upper spring base of the bearing spring 12 is actively adjusted relative to the assembly 24 for level regulation and/or dynamic ride control of the body (assembly 24) of the motor vehicle.

Figure 3:
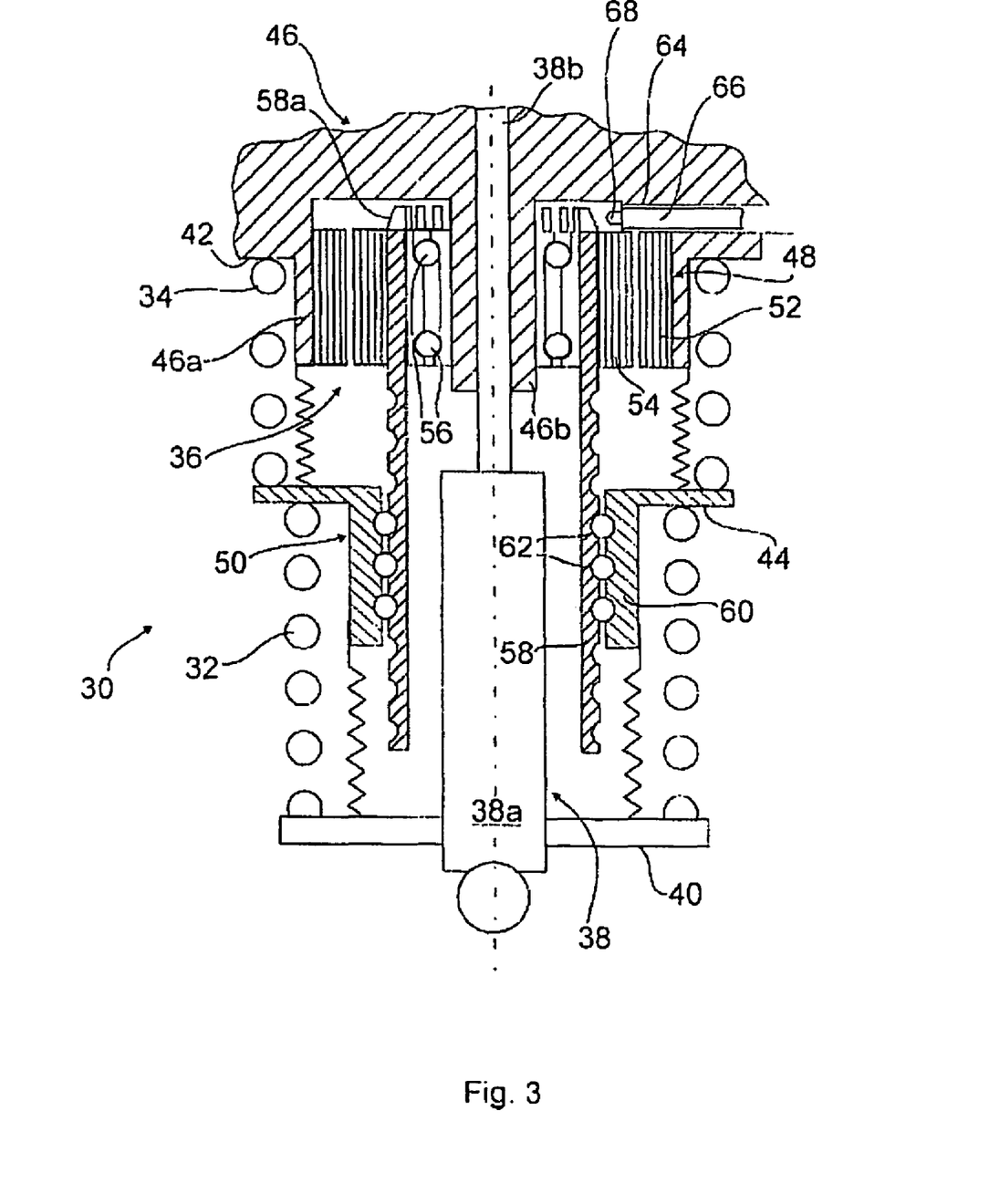
FIG. 3 in diagrammatic sectional view, a spring strut of a wheel suspension for motor vehicles with a central telescoping shock absorber, a series-connected bearing spring and preloaded spring, and with an electric actuator with a ball screw and a bistable lock.
Figure 4:
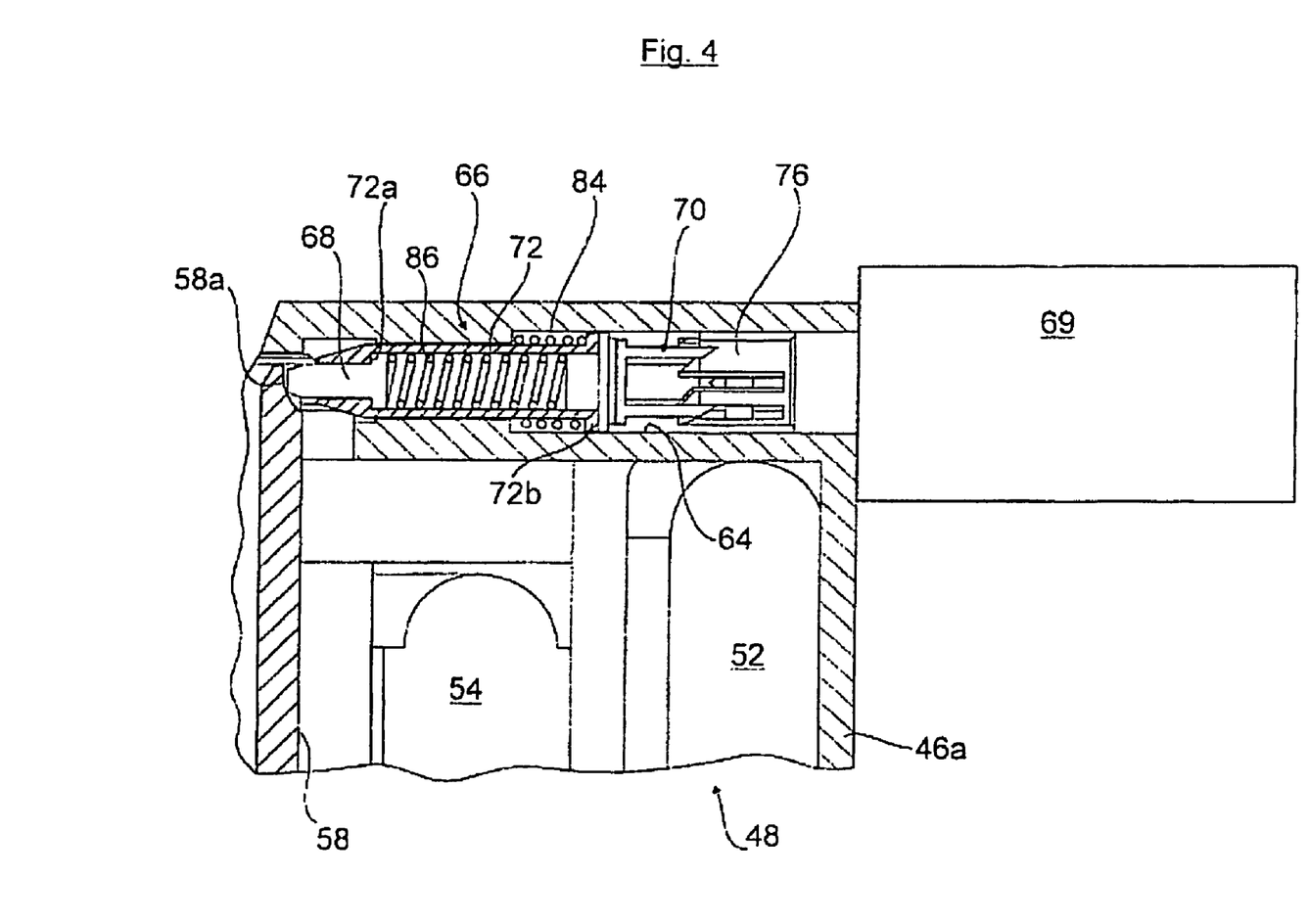
FIG. 4 in a detailed sectional view, the bistable lock of the spring strut shown in FIG. 3.
Figure 5:
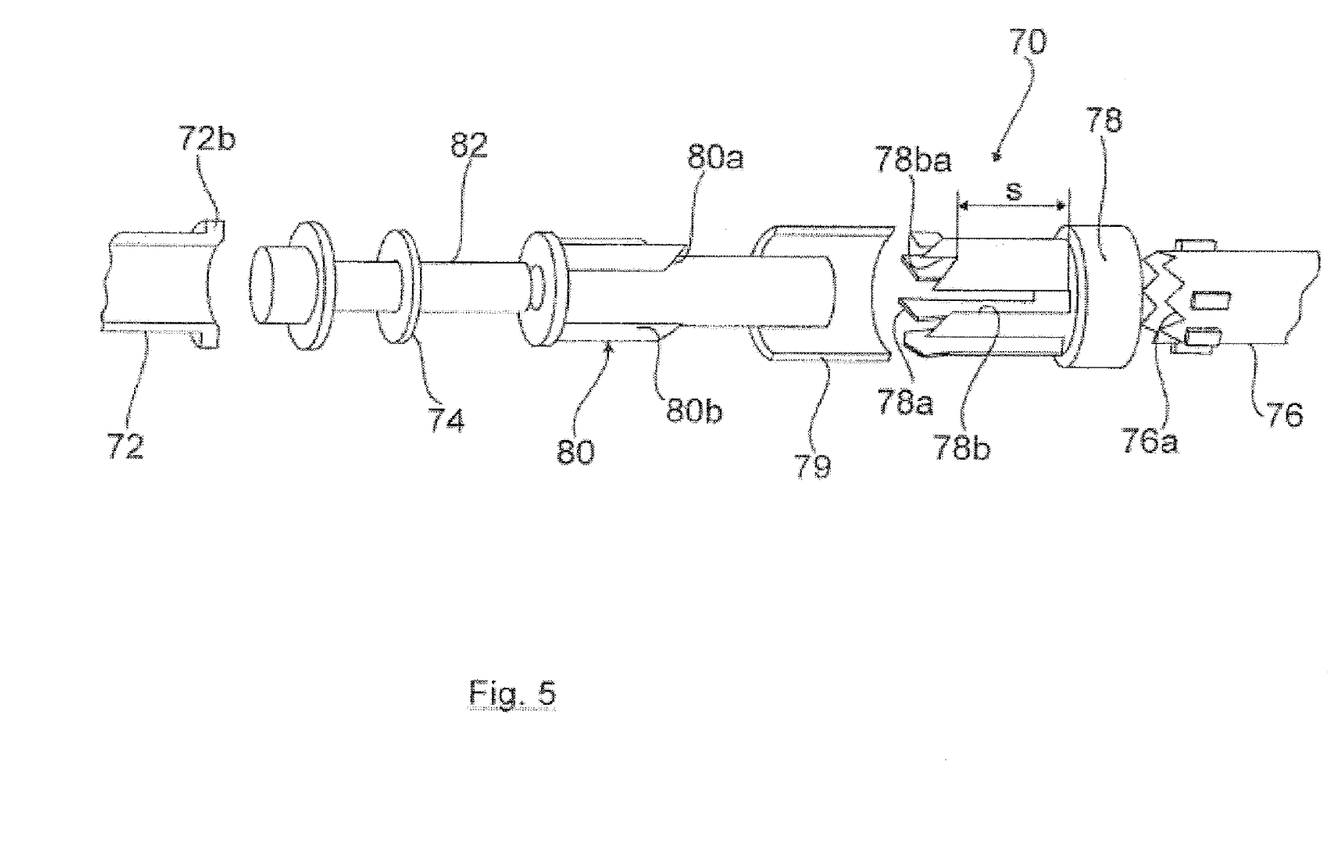
FIG. 5 details of the lock according to FIGS. 3 and 4 in a three-dimensional exploded view.

The actuator 18 consists conventionally of an electric motor and an adjustment drive that acts on the adjustable spring seat 22 (cf., e.g., the following FIGS. 3 to 5).

In the actuator 18, an electromagnetically actuated brake or lock (indicated by the arrow 26) is provided, which can be open or closed in the unpowered (not triggered) state that has a bistable action. A triggering of the brake or lock 26 is necessary only for switching from the open position into the closed position and vice versa.

In a non-self-inhibiting adjustment drive of the actuator 18, this means that the spring seat 22 is attached permanently to the adjustment drive in the closed position of the brake or the lock 26 and without application of current and thus ensures that the position of the suspension means 10 remains at a set height.

In the open position of the brake or lock 26, it is specified in contrast that the automatically occurring adjustment of the adjustment drive of the actuator 18 causes the suspension means 10 to be able to occupy a design-specified basic position, in which the bearing spring 12 and the preloaded spring 14 are located in an equilibrium of forces.

It should be noted at this point that in a chassis control of the described type, quick response times (e.g., for dynamic ride control), which produce corresponding smooth-running adjustment drives of the actuator 18, are necessary. In particular (although not exclusively) for such adjustment drives, the arrangement of a bistable brake or lock is especially advantageous.

Figure 2:
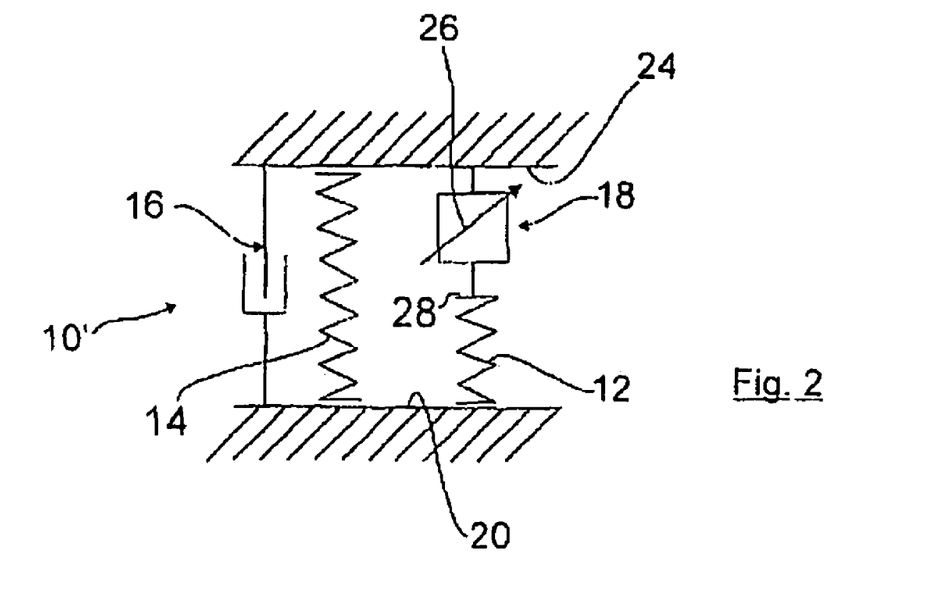
FIG. 2 another equivalent circuit diagram of a suspension means according to FIG. 1, but with a preloaded spring that is arranged parallel to the bearing spring.

FIG. 2 shows an alternative embodiment of the suspension means 10'. To avoid repetitions, only the essential differences are described. Functionally identical parts are provided with the same reference numbers.

According to FIG. 2, the bearing spring and the preloaded spring 14 are connected in parallel. Thus, the preloaded spring 14, analogous to the shock absorber 16, is supported on the lower end in the wheel guide element 20 and on the upper end in the assembly 24.

The bearing spring 12 is in series with the electric actuator 18, which, on the one hand, attaches to the assembly 24, and, on the other hand, to an adjustable spring seat 28; the bearing spring 12 is also supported on its lower end on a wheel guide element 20 (which does not have to be identical to the wheel guide element 20 of the preloaded spring 14).

In turn, a bistable brake or lock 26, as described above, is arranged in the actuator 18. The function of the suspension means 10' is essentially the same as the suspension means 10 of FIG. 1. By moving the spring base 28 by means of the actuator 18, the force between the assembly 24 (axle support or body) and the wheel guide element is increased or decreased and held with the brake or lock 26 (closed position) or released to occupy a basic position (open position).

With respect to the views of FIGS. 1 and 2, the following should be noted:

The bearing springs 12 and/or the preloaded springs 14 can also be springs of types other than helical compression springs, e.g., torsion springs or combinations thereof. The suspension means 10, 10' can also be provided on spring strut embodiments or guide rod combinations of wheel suspensions for steered or unsteered wheels of the motor vehicle.

In addition, unlike what is shown in FIGS. 1 and 2, the force contact points of the force elements (absorber, actuator, spring) can be optionally in the body or the axle support (above) or wheel guide elements (wheel trunks, guide rods) (below). Not all force elements have to have the same force contact points.

The actuation of the lock 26 can be controlled electrically or electromagnetically via an electronic control device, in which the control can have a feedback means for detecting the switching status of the brake or the lock 26.

In FIGS. 3 to 5, an adjustment device that is shown on a spring strut 30 for a wheel suspension of a motor vehicle is shown for the partial load-bearing, active suspension means, which essentially consists of a bearing spring 32, a series-connected preloaded spring 34, and an electrical actuator 36.

The springs 32, 34 that are designed as helical compression springs are arranged in FIG. 3 around a central telescoping shock absorber 38 and are supported on a lower spring seat 40, on an upper spring adapter 42, and, on both sides, on an axially adjustably-guided adjustment spring seat 44.

The lower spring seat 40 is coupled to the cylinder liner 38a of the shock absorber 38. On its lower end, the cylinder liner 38a is fastened to a wheel guide element, not shown; furthermore, the cylinder rod 38b of the shock absorber 38 is connected to the assembly of the motor vehicle in a way, not shown, via a vibration-absorbing bearing and an annular base plate 46.

The actuator 36 has a hollow-cylindrical electric motor 48 and an adjustment drive 50. The electric motor 48 is arranged with its stator 52 and rotor 54 inside a tube-like projection 46a of the base plate 46.

The adjustment drive 50 is a ball screw with a threaded spindle 58 that is mounted to rotate but not to move axially via a four-point bearing 56 on a guide bushing 46b of the base plate, a ball nut 60, and roller elements or balls 62 that are located in-between. The ball nut 60 is made in one piece with the adjustment spring seat 44. Furthermore, the threaded spindle 58 is nonrotatably connected to the rotor 54 of the electric motor 48.

By triggering the electric motor 48, the ball nut 60 with the spring seat 44 can be height-adjusted via the rotor 54 that drives the threaded spindle 58, whereby, as described above, the base seat of the bearing spring 32 can be adjusted relative to the base plate 46 or to the structure of the motor vehicle for level adjustment or to a dynamic ride control of the motor vehicle.

A bistable-action lock 66, which is depicted roughly diagrammatically in FIG. 3, is inserted into an approximately radially oriented hole 64 in the base plate 46. The lock 66 has a radially adjustable locking pin 68 that can engage positively on the front side in a crown toothed wheel work 58a incorporated in the threaded spindle 58.

The lock that is generally referred to as 66 consists of the following according to FIGS. 4 and 5:

The lock 66 essentially has an electromagnetic adjusting member 69 with a solenoid (not shown), a mechanical step switching system 70, and the axially displaceable locking pin 68 that is housed in an adjustment bushing 72.

The step switching system 70 of the lock 66 here consists essentially of a stud 76 that is actuated by the solenoid of the adjusting member 69 (cf. in particular FIG. 5) with inclined positioning surfaces 76a, a stationary gear shifting gate 78, a rotationally guided gear shifting gate 80, and a transfer mandrel 82, which acts via the adjustment bushing 72, a stop disk 74, and a flange 72b of the adjustment bushing 72 on a prestressed return spring 84 (FIG. 4) and on the locking pin 68. Moreover, a guide bushing 79 is provided around the stationary gear shifting gate 78.

The locking pin 68 is arranged displaceably inside the adjustment bushing 72 via another helical compression spring 86, with the spring 86 prestressing the locking pin 68 against an annular collar 72b of the adjustment bushing 72. The locking pin 68, as is evident, is designed conically tapered for better engagement in the toothed wheel work 58a of the threaded spindle 58.

Figure 6:
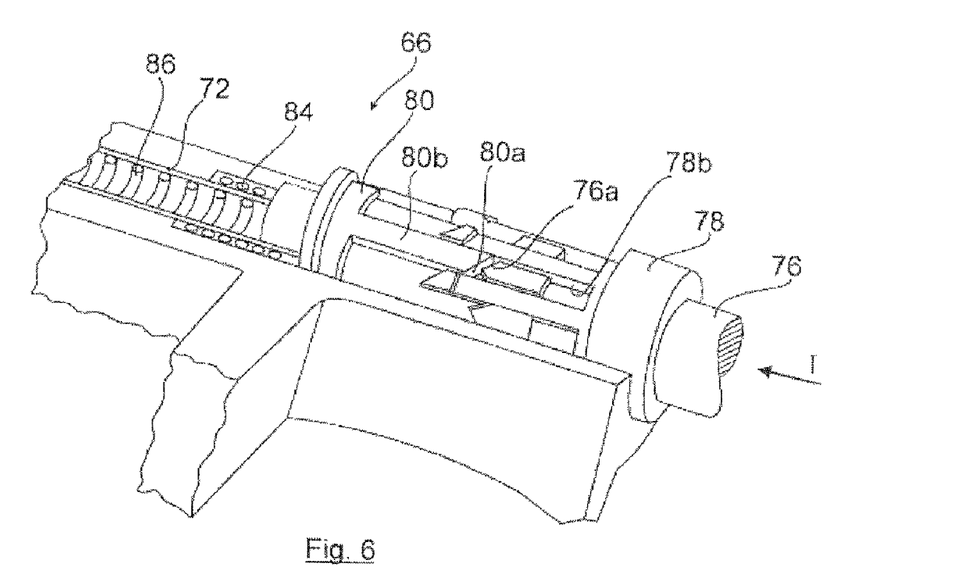
FIGS. 6 and 7 in detailed sectional views, the lock in a closed state.

The depicted step switching system 70 in connection with the electromagnetic adjusting member 69 acts as follows:

If the adjusting member 69 is triggered electrically, the stud 76 that is actuated via the solenoid, that is non-rotatably guided and that penetrates bushing-like gear shifting gates 78, extends according to FIG. 6 in the direction of arrow I with the front-side inclined positioning surfaces 76a, and the gear shifting gate 80 rotates in interaction with front-side beveled edges 80a on radially projecting axial webs 80b by a defined amount that is predetermined by the inclined surfaces 78a, 80a. In FIG. 6, the lock 66 is shown in its closed position.

When the stud 76 is extended in the direction of arrow I, the axial webs 80b of the gear shifting gate 80 disengage at the same time from slot-shaped axial grooves 78b of the stationary gear shifting gate 78. The rotation of the gear shifting gate 80 with the simultaneous movement thereof in axial direction is such that with each axially-directed actuation of the stud 76, the axial webs 80b in the shape recovery of the gear shifting gate 80 are retraced via the return spring 84 into the respective adjacent axial groove 78b of the stationary gear shifting gate 78.

To this end, the gear shifting gate 80 has four axial webs 80b, and the gear shifting gate 78 has eight axial grooves 78b, whereby an axial groove 78ba is made shorter by the distance s (FIG. 5). By this design of the step switching system 70, either an axial web 80b of the gear shifting gate 80 with the shortened axial groove 78ba interacts with each triggering of the solenoid of the electromagnetic adjustment drive 69 in such a way that the locking pin 68 with the adjustment bushing 72 extends into the toothed wheel work 58a of the threaded spindle 58 of the adjustment drive 50 and is held (closed position), or the gear shifting gate 80 rotates in another triggering of the solenoid, and the axial webs 80b are retracted into the longer axial grooves 78b, with then the return spring 84 pushing the adjustment bushing 72 back with the locking pin 68 (open position). The described "open" or "closed" positions take turns alternating each time the electromagnetic adjusting member 69 is triggered.

Figure 7:
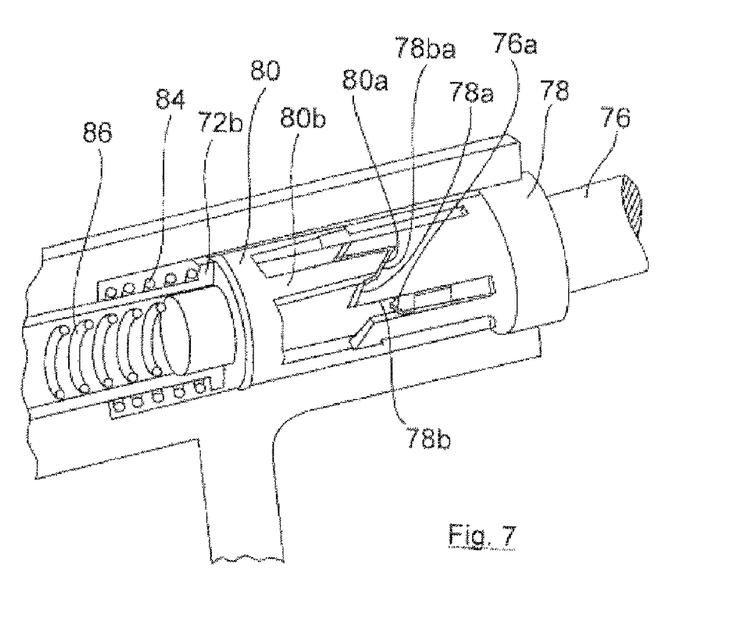

Thus, the closed state of the lock 66, in which an axial web 80b of the rotatable and axially movable gear shifting gate 80 is retracted into the shortened axial groove 78ba, is shown in FIG. 7. In this instance, the locking pin 68 is ratcheted with the toothed wheel work 58a of the threaded spindle 58 of the adjustment drive 50.

If, in the retraction of the locking pin 68 with the adjustment bushing 72 of the step switching system 70, the locking pin 68 should come to rest on a tooth point of the crown toothed wheel work 58a of the threaded spindle 58, the locking pin 68 can retract into the adjustment bushing 72 because of the spring 86 and is prestressed like a spring in this position. The locking pin 68 then engages in a small relative movement between the toothed wheel work 58a and the locking pin 68 in the closest tooth gaps of the toothed wheel work 58a.

Instead of the threaded spindle 58, in a correspondingly designed ball screw 50 even in kinematic reversal, the ball nut 60 can be arranged to rotate relative to the threaded spindle 58 and can be driven via the electric motor 48, with said toothed wheel work or crown toothed wheel work 58a then having to be provided on the ball nut 60.

The invention claimed is:

1. An adjustment device for suspension means in wheel suspensions of motor vehicles, with the suspension means having a first spring, a bearing spring that is arranged between a assembly of the motor vehicle and wheel guide elements, and a second spring, for example a preloaded spring that is connected in parallel or in series, as well as an electrically-actuated actuator, by means of which a force adjustment between the motor vehicle assembly and the wheel guide elements is made possible, wherein the electric actuator is provided with an integrated brake or lock that acts in a bistable manner in such a way that in the unpowered state, it can occupy an open or closed position, and that can be switched by means of electric actuation from the open to the closed position and vice versa.

2. The adjustment device according to claim 1 wherein a toothed wheel work on a threaded spindle of a ball screw corresponding to the lock is a crown toothed wheel work that is incorporated on the front side of the threaded spindle.

3. The adjustment device according to claim 1 wherein in an event that errors occur the actuator, wherein the actuator is at least one actuator the lock or brake is detached on at least one actuator to ensure failsafe behavior.

4. The adjustment device according to claim 1 wherein a demand for lock or brake opening by an overriding motor vehicle control device is sent either to an actuator control device or directly to the lock or brake.

5. The adjustment device according to claim 1 wherein said step switching system comprises an electromagnetic lock which essentially consists of a stud with inclined positioning surfaces that is actuated by a solenoid, a stationary gear shifting gate, a rotatable gear shifting gate, and a transfer mandrel, which acts via an adjustment bushing on a prestressed return spring and on the locking pin.

6. The adjustment device according to claim 5 wherein a ball screw is arranged around a telescoping shock absorber of the wheel suspension of the motor vehicle and within the helical preloaded spring, wherein the preloaded spring is a helical preloaded spring and wherein the electromagnetic lock is arranged in a stationary manner in radial orientation to a threaded spindle or ball nut.

7. The adjustment device according to claim 6 wherein an adjusting member that interacts with the locking pin of the lock is a threaded spindle that is actuated by an electric motor or a ball nut of a ball screw that acts on the second spring.

8. The adjustment device according to claim 1, wherein the lock that acts in a bistable manner with a locking pin that is actuated in particular via a mechanical step switching system and that engages in particular in the closed position in a toothed wheel work of an adjusting member that is actuated by an electric motor of the actuator.

9. The adjustment device according to claim 8, wherein the lock is arranged in a radial hole of a base plate, which preferably accommodates, the electric motor of the actuator, and a cylinder rod of a shock absorber and the second spring are supported on an assembly side.

10. The adjustment device according to claim 8 wherein the locking pin is flexibly prestressed against the toothed wheel work of the adjusting member, with insertion of a spring into the locking position.

11. The adjustment device according to claim 10 wherein the spring that flexibly stresses the locking pin is arranged inside an adjustment bushing and prestresses the locking pin against an annular collar of the adjustment bushing.

12. The adjustment device according to claim 10 wherein the toothed wheel work is provided directly on a rotor of the electric motor.

13. A mechanism for selectively locking and unlocking a rotor of an electric motor of a height adjusting device of a wheel suspension system of a motor vehicle, comprising;
   a gear secured to and coaxially disposed relative to said rotor;
   a housing having a first set of forward opening, circumferentially spaced recesses relative to an axis thereof, each having a first depth, and a second set of forwarding opening, circumferentially spaced recesses relative to said axis, each disposed between a successive pair of said first set of recesses and having a depth less than said first set of recesses;
   an axially displaceable member mounted on said housing having a set of rearwardly extending, circumferentially spaced segments receivable alternatively in said first and second set of recesses, each having a contact surface disposed in a plane disposed at an angle relative to said axis;
   means interposed between said housing and said displaceable member for biasing said displaceable member rearwardly;
   a locking pin displaceable axially, having a portion extendable out of said housing and into engagement with teeth of said gear;
   means interposed between said displaceable member and said locking pin for biasing said pin forwardly; and
   a solenoid having a rod received in said housing and axially displaceable relation thereto, provided with a set of circumferentially spaced surfaces, each disposed in a plane disposed at an angle relative to said axis, engageable with said contact surfaces of said displaceable member whereby upon reciprocation of said rod, said engaging surfaces of said rod and said displaceable member will cooperate with the biasing action of said biasing means to axially displace and rotate said displaceable member, causing said protruding segments to alternatively be inserted into said first and second sets of recesses and correspondingly causing said locking pin to extend and retract into and out of engagement with said gear teeth.

14. A mechanism for selectively locking and unlocking the rotor of an electric motor of a height adjusting device of a wheel suspension system of a motor vehicle, comprising:
   a gear secured to and coaxially disposed relative to said rotor;
   a guide bushing;
   an annular base member coaxially mounted on said guide bushing having a cylindrical section projecting into a guide housing, having a first set of circumferentially spaced, longitudinally disposed slots in an inner end thereof, each of a first depth, and second set of circumferentially spaced, longitudinally disposed slots in said inner end thereof, each disposed between a succession pair of said first mentioned slots and having a depth less than the depth of said first mentioned slots;
   a shiftable member coaxially disposed in said guide member having a set of circumferentially spaced, longitudinally extending sections, each alignable with and receivable in a slot of the cylindrical section of said base member and having an engageable cam surface in a place disposed at an angle relative to an axis of said guide bushing;
   a transfer member axially disposed in said guide bushing;
   a locking pin bushing axially disposed in said guide bushing, having a coil spring coaxially disposed between shoulders of said guide bushing and locking pin bushing and said transfer member for biasing said transfer and shiftable members toward said base member;

a locking pin axially disposed in said locking pin housing, partially extendable through an opening therein into engagement with teeth of said gear, and a spring disposed between said pin housing and said pin for biasing said pin through said opening; and a solenoid having a rod axially received in said base member, provided with a set of circumferentially spaced cam surfaces engageable with cooperable cam surfaces of said shiftable member, wherein upon reciprocation of said solenoid rod said cam surfaces of said solenoid rod will react with said cam surfaces of said shiftable member to cause such shiftable member to axially displace and index circumferentially, correspondingly causing said locking pin to engage and disengage the teeth of said gear.

\* \* \* \* \*